Patented Nov. 16, 1926.

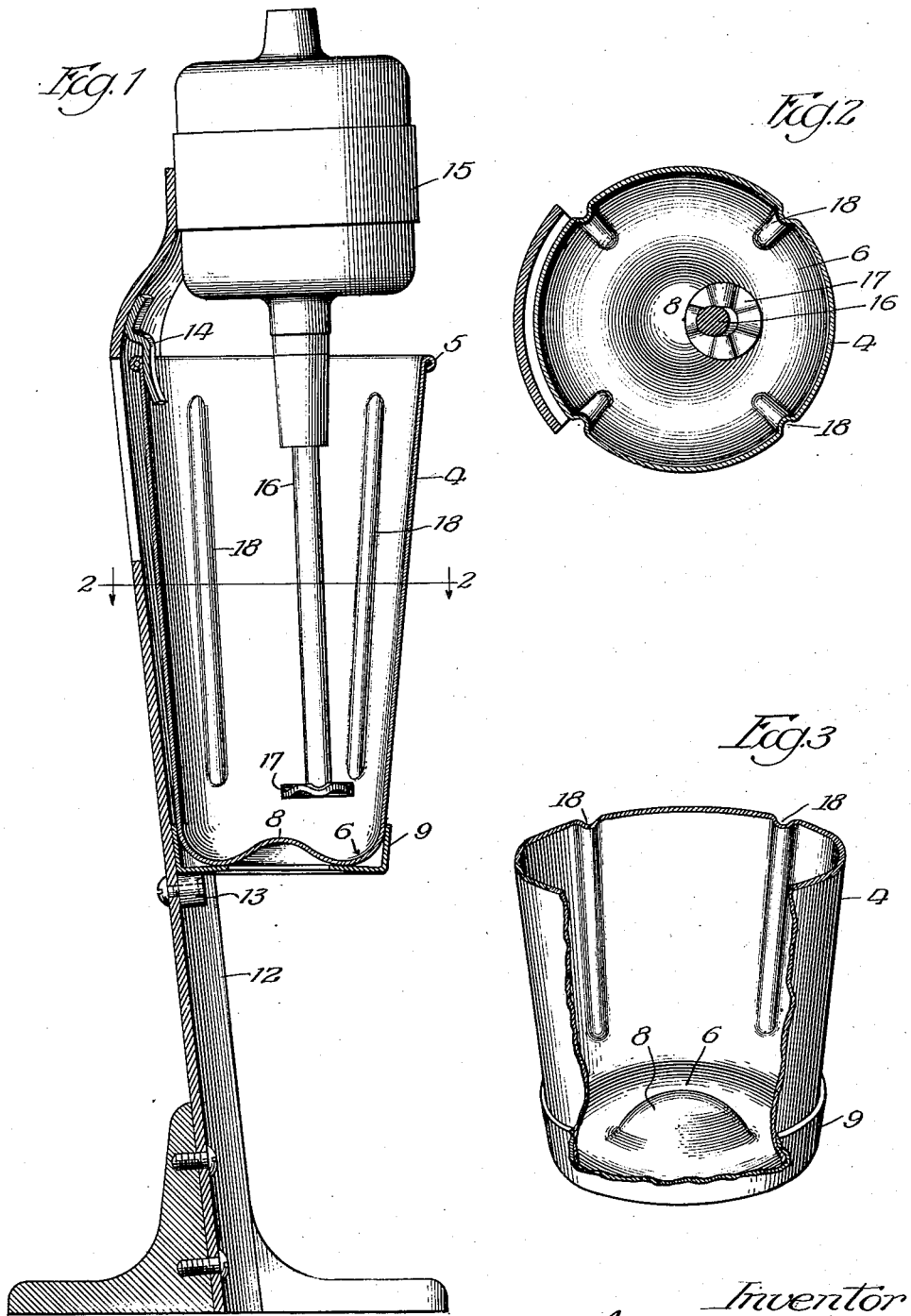

1,606,992

UNITED STATES PATENT OFFICE.

RAYMOND B. GILCHRIST, OF NEWARK, NEW JERSEY, ASSIGNOR TO THE GILCHRIST COMPANY, OF NEWARK, NEW JERSEY, A CORPORATION OF NEW JERSEY.

MIXING RECEPTACLE FOR ELECTRIC DRINK MIXERS.

Application filed December 26, 1923. Serial No. 682,620.

The invention relates to mixing receptacles used with electrically operated drink mixers.

The object of the invention is to provide an improved formation in or adjacent the bottom of the receptacle which will cooperate with the agitator of the mixer to expedite the mixing operation and assist in aerating the liquid being mixed.

The invention consists in the several novel features hereinafter set forth and more particularly defined by claims at the conclusion hereof.

In the drawings: Fig. 1 is a vertical section of a mixing receptacle embodying the invention, being shown in operative position in an electric drink mixer. Fig. 2 is a section on line 2—2 of Fig. 1. Fig. 3 is a detail perspective partly in section of the lower end of the mixing receptacle.

The invention is exemplified in a mixing receptacle which is made up of a shell of sheet metal and a reinforcing bottom member. The shell is formed in a suitable member to form an upwardly flared annular side wall 4, the top margin of which is crimped, as at 5, to form a reinforced rim, and an integral bottom which has its outer margin curved upwardly and outwardly, as at 6, to its juncture with the side wall 4 and a central arched or convex portion 8 within the curved bottom portion 6. The reinforcing ring comprises an annular upwardly extending flange 9 which has its upper end soldered to the side wall 4 and an inwardly upwardly inclined flange, the inner end of which is soldered to the bottom.

The improved receptacle is illustrated as held in a mixer comprising a supporting column and guide 12, a stud 13 carried by the column and forming a bottom-support for the receptacle, a hook 14 adapted to extend into the upper portion of the receptacle to retain it on the stud 13, an electric motor 15 having a shaft 16 depending therefrom and an agitator 17 fixed to the lower end of the shaft. In practice, the agitator is usually disposed eccentrically in the receptacle to lessen the vortex, resulting from high speed rotation of the liquid in the receptacle, by causing the rotation of the liquid to be restricted between the shaft and one side of the receptacle. In practice, the agitator-shaft is operated at speeds ranging from 10,000 to 15,000 revolutions per minute. Vertically extending indentations or ribs 18 are formed in the sides 4 of the receptacle to retard the rotation of the upper portion of the liquid. It has been found that by curving the outer portion of the bottom of the receptacle upwardly and outwardly and providing it with a centrally arched or convex portion, agitation of the liquid in the lower portion of the vessel, and particularly below the retarding ribs 18. is greatly increased. It is believed that the liquid is projected outwardly by the agitator and somewhat upward and downwardly, and the bottom facilitates the return flow and assists in deflecting the liquid inwardly and upwardly to the agitator. It has also been observed that the surging of the liquid in the receptacle is increased and this it is believed accelerates mixing of the constituents and aeration of the liquid.

The invention exemplifies an improved mixing receptacle for use in electric drink mixers, in which the bottom has a formation which coacts with the agitator to accelerate mixing and increases the aeration resulting therefrom.

The invention is not to be understood as restricted to the details set forth, since these may be modified within the scope of the appended claims, without departing from the spirit and scope of the invention.

I claim:

1. The combination with a drink mixer having a depending shaft and an agitator and an electric motor for driving the shaft, of a receptacle for use with said mixer having a body comprising a comparatively narrow bottom and a relatively high side and having an open top, the bottom having its outer portion curved upwardly to the side so as to deflect the material upwardly, and an upwardly arched central portion.

2. The combination with a drink mixer having a depending shaft and an agitator and an electric motor for driving the shaft, of a receptacle adapted for use with the mixer comprising a body having a comparatively narrow bottom, and a relatively high side and an open top, the bottom having its outer portion curved upwardly to the sides so as to deflect the material upwardly, an upwardly arched central portion, and a reinforcing ring composed of an upwardly extending flange joined to the side of the body adjacent said upwardly curved portion of the bottom, and an inwardly extending flange connected to the lower margin of said first mentioned flange and joined to the bottom of the body between said upwardly curved portion, and the arched central portion.

Signed at Newark, New Jersey, this 12th day of December, 1923.

RAYMOND B. GILCHRIST.